(12) United States Patent
Schroeder et al.

(10) Patent No.: US 9,764,343 B2
(45) Date of Patent: Sep. 19, 2017

(54) ELECTRO-HYDRAULIC ACTUATED SPRAY GUNS

(71) Applicant: Graco Minnesota Inc., Minneapolis, MN (US)

(72) Inventors: James C. Schroeder, Ramsey, MN (US); Christopher A. Lins, Crystal, MN (US); Steven R. Kuczenski, New Brighton, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 14/400,201

(22) PCT Filed: May 9, 2013

(86) PCT No.: PCT/US2013/040386
§ 371 (c)(1),
(2) Date: Nov. 10, 2014

(87) PCT Pub. No.: WO2013/170058
PCT Pub. Date: Nov. 14, 2013

(65) Prior Publication Data
US 2015/0097054 A1 Apr. 9, 2015

Related U.S. Application Data

(60) Provisional application No. 61/645,274, filed on May 10, 2012.

(51) Int. Cl.
*B05B 9/04* (2006.01)
*E01C 23/22* (2006.01)
(Continued)

(52) U.S. Cl.
CPC .......... *B05B 9/0409* (2013.01); *B05B 1/3026* (2013.01); *B05B 13/005* (2013.01);
(Continued)

(58) Field of Classification Search
CPC ..... B05B 9/007; B05B 9/0403; B05B 9/0409; B05B 9/0413; B05B 9/0423; B05B 13/005
(Continued)

(56) References Cited

U.S. PATENT DOCUMENTS 3,163,360 A * 12/1964 McNinch, Jr. ............ B05B 9/01
222/334
3,477,352 A * 11/1969 Campbell ............. E01C 23/166
118/72
(Continued)

FOREIGN PATENT DOCUMENTS

CN 200971469 Y 11/2007
CN 202116970 U 1/2012
(Continued)

OTHER PUBLICATIONS

Patent Cooperation Treaty, International Searching Authority, International Search Report and Written Opinion, Aug. 19, 2013, 12 pages.
(Continued)

*Primary Examiner* — Arthur O Hall
*Assistant Examiner* — Joseph A Greenlund
(74) *Attorney, Agent, or Firm* — Kinney & Lange, P.A.

(57) ABSTRACT

An electro-hydraulic actuation system for a sprayer comprises a hydraulic system, a hydraulic actuator, an electric actuator and a sprayer. The hydraulic system is for pressurizing a hydraulic fluid. The hydraulic actuator is powered by the hydraulic system. The electric actuator controls actuation of the hydraulic actuator by the hydraulic system. The sprayer is actuated by the hydraulic actuator.

20 Claims, 8 Drawing Sheets

(51) Int. Cl.
  *B05B 1/30* (2006.01)
  *B05B 13/00* (2006.01)
  *F16H 59/02* (2006.01)
  *F16H 61/4035* (2010.01)
  *A63C 19/06* (2006.01)

(52) U.S. Cl.
  CPC ......... *E01C 23/22* (2013.01); *F16H 59/0217* (2013.01); *F16H 61/4035* (2013.01); *A63C 2019/067* (2013.01); *B05B 9/0403* (2013.01); *B05B 9/0413* (2013.01); *B05B 9/0423* (2013.01); *B60Y 2200/40* (2013.01)

(58) Field of Classification Search
  USPC ........... 239/88–95, 1, 150, 578; 137/294, 58
  See application file for complete search history.

(56) References Cited

U.S. PATENT DOCUMENTS

| | | | | |
|---|---|---|---|---|
| 3,576,151 A * | 4/1971 | Sendoykas | ............ | F15B 15/261 254/93 R |
| 3,705,687 A * | 12/1972 | Vicentini | ................ | B24B 57/00 239/296 |
| 4,236,950 A * | 12/1980 | Eigenmann | ........... | E01C 23/185 118/305 |
| 4,247,045 A * | 1/1981 | Mitchell | ................... | B05B 9/06 239/156 |
| 4,256,261 A * | 3/1981 | Gurney | ................. | E01C 23/166 239/112 |
| 4,684,052 A * | 8/1987 | McDonald | ........... | B23K 35/302 228/122.1 |
| 4,684,062 A * | 8/1987 | Bagwell | ................ | B05B 9/0409 239/1 |
| 4,893,751 A * | 1/1990 | Armstrong | ............... | E01C 23/22 118/305 |
| 5,114,268 A * | 5/1992 | Marcato | ................... | E01C 23/22 404/101 |
| 5,302,207 A * | 4/1994 | Jurcisin | ................... | E01C 23/22 118/207 |
| 5,368,232 A * | 11/1994 | Schroeder | .............. | A63C 19/08 239/150 |
| 5,947,385 A * | 9/1999 | Lanerd | .................. | E01C 23/166 239/146 |
| 5,984,646 A * | 11/1999 | Renfro | .................. | B05B 9/0409 417/375 |
| 6,413,012 B1 * | 7/2002 | Jones | .................... | E01C 23/166 239/150 |
| 7,673,815 B2 * | 3/2010 | Schroeder | ............... | E01C 23/22 239/146 |
| 7,823,752 B2 * | 11/2010 | Riney | ..................... | B05C 5/001 222/146.5 |
| 8,662,857 B2 * | 3/2014 | Hukriede | ................ | F04B 17/05 222/315 |
| 2001/0030244 A1 * | 10/2001 | Schroeder | ............. | E01C 23/166 239/146 |
| 2004/0018053 A1 * | 1/2004 | Starry, Jr. | ............. | E01C 19/238 404/129 |
| 2004/0189009 A1 * | 9/2004 | Galich | .................... | F03B 13/00 290/54 |
| 2004/0238661 A1 * | 12/2004 | Schroeder | ............... | B05B 9/007 239/722 |
| 2006/0005765 A1 * | 1/2006 | Davidson | ............... | B05B 13/041 118/323 |
| 2007/0090203 A1 * | 4/2007 | Quenzi | ................... | E04G 21/04 239/197 |
| 2010/0065292 A1 * | 3/2010 | Baker | .................... | A63C 19/08 172/126 |
| 2010/0301127 A1 * | 12/2010 | Anderton | ................. | E01H 3/02 239/1 |
| 2013/0161357 A1 * | 6/2013 | Verby | ..................... | F04B 17/06 222/251 |

FOREIGN PATENT DOCUMENTS

| | | |
|---|---|---|
| WO | 2008068583 A1 | 6/2008 |
| WO | 2008147892 A1 | 12/2008 |

OTHER PUBLICATIONS

Second Chinese Office Action, for Chinese Patent Application No. 201380024492.1, dated Apr. 28, 2016, 12 pages.
Extended European Search Report for European Patent Application No. 13787214.9, dated Jun. 9, 2016, 6 pages.
Australian Patent Examination Report for AU Application No. 2013259463, dated Aug. 23, 2016, 3 pages.
Third Chinese Office Action, for Chinese Patent Application No. 2013800244921, dated Sep. 20, 2016, 4 pages.

* cited by examiner

ELECTRO-HYDRAULIC ACTUATED SPRAY GUNS

BACKGROUND

The present disclosure relates generally to line striping systems, such as those used for applying painted stripes to roadways and athletic fields. More particularly, the present disclosure relates to activation systems for self-propelled line striping systems.

Line striping systems typically comprise carts that include a gas-operated engine that drives a pump. The pump is fed a liquid, such as paint, from a container disposed on the cart and supplies pressurized fluid to spray nozzles mounted so as to discharge toward the ground. Conventional line striping systems comprise walk-behind carts that are pushed by the operator, who simultaneously operates the spray nozzles with levers mounted to a handlebar for the cart. Such a handlebar typically comprises a fixed pair of handles that are used to orientate swivel-mounted wheels at the front of the cart. These handlebars require the operator to manually actuate the spray nozzles to determine the length of each stripe and the interval between stripes, while physically pushing and turning the entire system.

Line striping carts can be pushed by self-propelled trailers that attach to the rear of the carts, such as at a ball and socket hitch. Each trailer includes a gas-operated engine, separate from the pumping engine, that drives a hydrostatic propulsion system. An operator sits on the trailer and grasps the handlebar of the cart. The hydrostatic propulsion system is typically operated with foot pedals that leave hands of the operator free to manipulate the spray nozzle levers of the cart. In order to facilitate application of straight-line stripes, the front swivel-mounted wheels can be locked to promote straight-line movement of the cart. The pivot-point between the cart and the trailer at the hitch still allows for steering of the system by "wiggling" the cart relative to the trailer. These systems reduce operator fatigue, but still require operator judgment in applying the stripes and are bulky and difficult to maneuver.

Conventional line striping systems utilize compressed air to actuate the spray nozzles. Spray nozzles that utilize compressed air react slowly to activation. Thus, a delay results between the activation and the actual spraying process, which can generate stripes of varying lengths. Additionally, generation of compressed air requires powering of an air compressor that adds weight, cost and complexity to the line striping system.

There is a continuing need to increase the consistency and accuracy of lines produced by the striping system, while at the same time reducing operator fatigue.

SUMMARY

The present disclosure is directed to an electro-hydraulic actuation system for a sprayer, such as those that can be used with self-propelled line stripers. The electro-hydraulic actuation system comprises a hydraulic system, a hydraulic actuator, an electric actuator and a sprayer. The hydraulic system is for pressurizing a hydraulic fluid. The hydraulic actuator is powered by the hydraulic system. The electric actuator controls actuation of the hydraulic actuator by the hydraulic system. The sprayer is actuated by the hydraulic actuator.

DETAILED DESCRIPTION

Figure 1A:
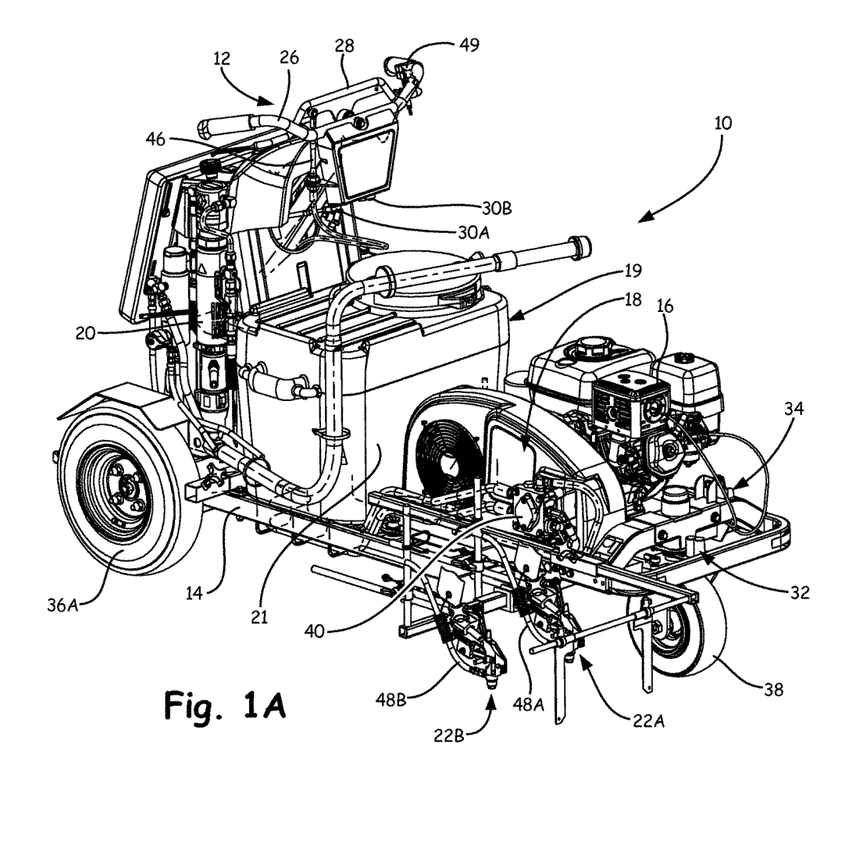
FIG. 1A is a perspective front view of a stand-on line striper in which an electro-hydraulic actuation system of the present disclosure is used.
Figure 1B:
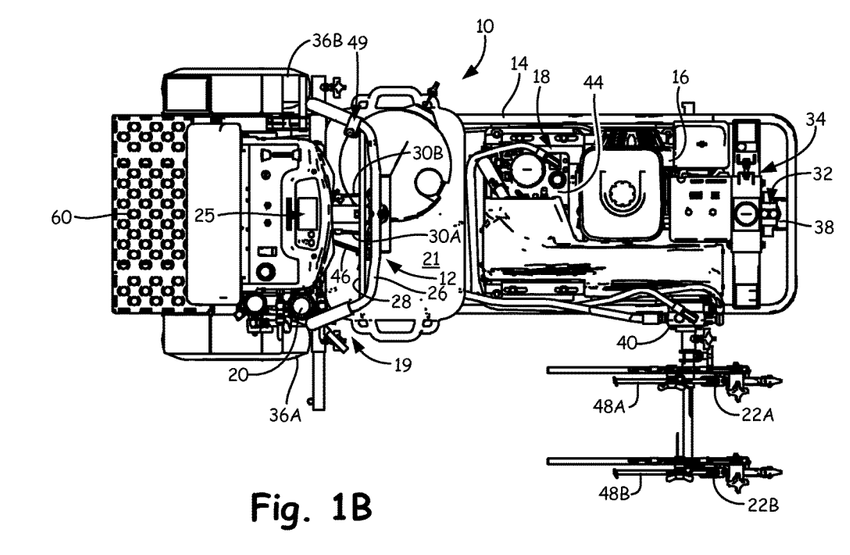
FIG. 1B is a top plan view of the stand-on line striper of FIG. 1A showing a hydraulic system and a paint system used in conjunction with the electro-hydraulic actuation system.

FIG. 1A is a perspective front view of stand-on line striper 10 in which an electro-hydraulic actuation system of the present disclosure is used. FIG. 1B is a top plan view of stand-on line striper 10 of FIG. 1A showing steering system 12, chassis 14, engine 16, hydraulic system 18 and paint system 19. Steering system 12 additionally includes forward and reverse speed controls. Paint system 19 comprises fluid pump 20, fluid container 21, spray guns 22A and 22B, actuators 23 (FIG. 2), solenoids 24 (FIG. 2) and controller 25. Steering system 12 includes handlebar 26, speed bar 28, steering cables 30A and 30B, centering device 32 and alignment system 34. Steering system 12 is coupled to power wheels 36A and 36B (FIG. 1B) and steering wheel 38. Hydraulic system 18 includes pump 40, motor 42 (FIG. 2) and reservoir 44 (FIG. 1B). FIGS. 1A and 1B are discussed concurrently.

Figure 2:
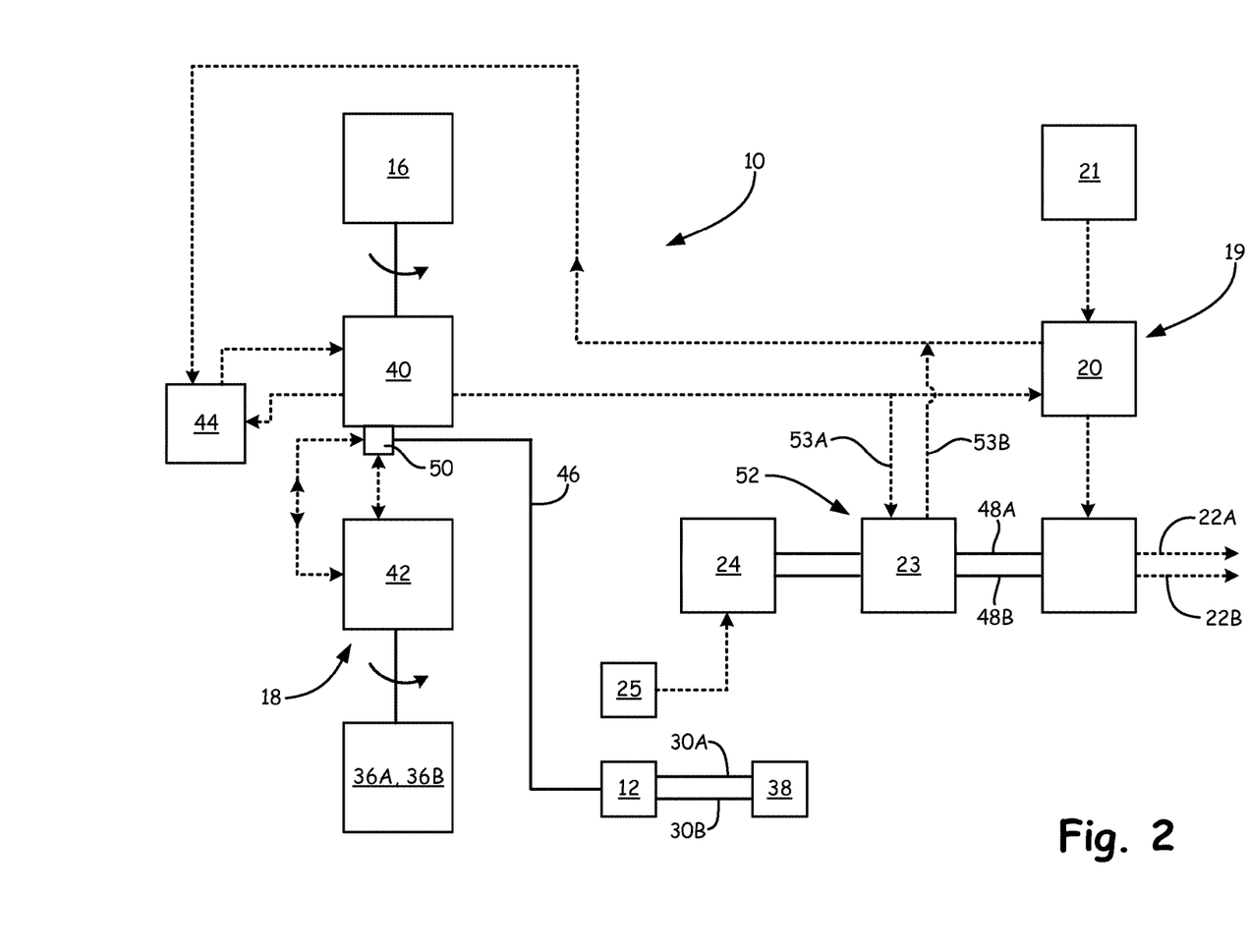
FIG. 2 is a schematic view of the hydraulic system and paint system of the stand-on line striper of FIGS. 1A and 1B interconnected with the electro-hydraulic actuation system.

Power wheels 36A and 36B and steering wheel 38 are mounted to chassis 14 so as to support line striper 10 and allow line striper 10 to roll under power from hydraulic system 18. Power wheels 36A and 36B are coupled to one or more hydraulic motors 42 (FIG. 2) that receive motive fluid power from pump 40, which is driven by engine 16. Via cable 46, speed bar 28 regulates pump 40 to control fluid flow from reservoir 44 (FIG. 1B) to motors 42 (FIG. 2). As such, in one embodiment, hydraulic system 18 operates as a hydrostatic propulsion system.

Steering wheel 38 is connected to handlebar 26 of steering system 12 via cables 30A and 30B to rotate steering wheel 38 relative to chassis 14. Cables 30A and 30B are pushed and pulled by rotation of handlebar 26. Centering device 32 pulls steering wheel 38 to center when handlebar 26 is not subject to rotational force. Alignment system 34 adjusts the position of centering device 32 so as to allow for tuning of steering system 12, such as may be needed to accommodate stretching of cables 30A and 30B or wear of wheel 38.

Engine 16 provides motive power to pump 40 of hydraulic system 18, which drives both wheels 36A and 36B and paint system 19. Fluid pump 20 receives an unpressurized fluid, such as paint, from fluid container 21 and provides pressurized fluid to spray guns 22A and 22B. In one embodiment, fluid pump 20 comprises a hydraulically operated double-acting piston pump. Spray guns 22A and 22B are mechanically operated by hydraulic actuators 23 (FIG. 2) that receive pressurized hydraulic fluid from hydraulic system 18. Hydraulic actuators 23 pull cables 48A and 48B to actuate spray guns 22A and 22B. Hydraulic actuators 23 are powered by solenoids 24 (FIG. 2), which are electronically controlled by controller 25. Hydraulic actuators 23 and solenoids 24 form part of an electro-hydraulic activation system of the present disclosure.

Controller 25 comprises a computer system that is configured to operate spray guns 22A and 22B via solenoids 24 based on operator inputs. For example, stand-on line striper 10 is configured to apply two parallel stripes of fluid from container 21 using spray guns 22A and 22B. Controller 25 controls when either or both of spray guns 22A and 22B are operated so that either one or two stripes are applied. Controller 25 also controls if the stripes are to be continuous or intermittent. If the stripes are to be intermittently applied, as specified by the operator, controller 25 controls the length of each stripe and the interval between stripes by controlling the length of time each spray gun is actuated. An operator of system 10 activates spray guns 22A and 22B with push-button 49 via controller 25, after setting desired parameters (e.g. single stripe, double stripe, stripe length, interval length) at controller 25.

FIG. 2 is a schematic view of hydraulic system 18 and paint system 19 of stand-on line striper 10 of FIGS. 1A and 1B interconnected with steering system 12 and actuation system 52. Hydraulic system 18 and paint system 19 are jointly operated by engine 16. In one embodiment, engine 16 comprises a gas-operated internal combustion engine. Engine 16 provides direct mechanical input to pump 40 via a system of belts and pulleys (not shown). Hydraulic system 18 may, however, include multiple pumps driven by engine 16. For example, a first hydraulic pump may provide input to motors 42, while a second pump may provide input to fluid pump 20, with both pumps operating with fluid from reservoir 44. Pump 40 draws hydraulic fluid from reservoir 44 and provides pressurized fluid directly to pump 20 and to motors 42 via valve 50. Pump 40 and pump 20 return hydraulic fluid directly to reservoir 44, while valve 50 re-circulates fluid to motor 42.

Figure 3A:
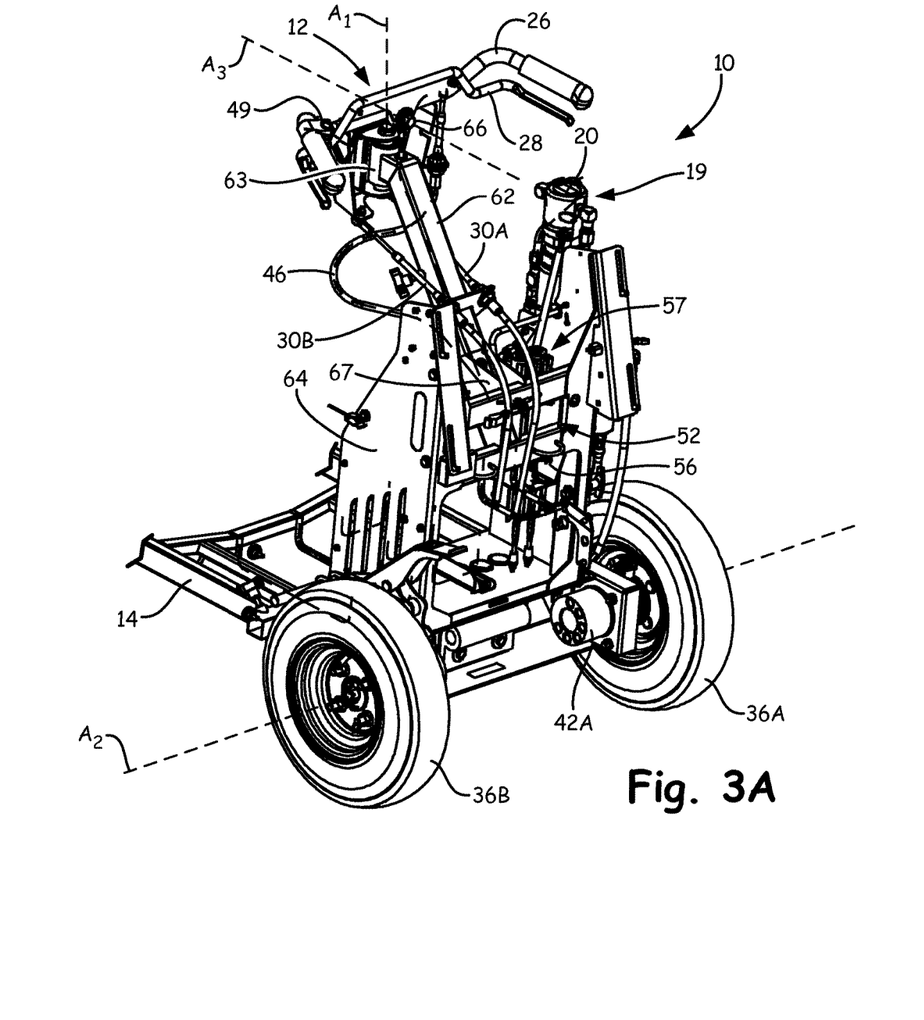
FIGS. 3A and 3B are rear and front perspective views, respectively, of the stand-on line striper of FIGS. 1A and 1B with parts of the hydraulic system and paint system removed to show the electro-hydraulic actuation system.

In one embodiment, engine 16, pump 40, motors 42, reservoir 44, wheels 36A and 36B and valve 50 comprise a hydrostatic system, as is known in the art. Although only one motor 42 is shown in FIG. 2, each of power wheels 36A and 36B may be provided with a dedicated motor served by pump 40. For example, power wheel 36A is connected to motor 42A, as shown in FIG. 3A. Motors 42 are configured to provide both forward and aft motive power to wheels 36A and 36B. Specifically, hydraulic system 18 utilizes reversing valve 50 with pump 40, as is known in the art, to reverse the direction of motors 42 by changing the direction of flow through motors 42.

Pump 40 (or another pump within system 18) additionally provides fluid power directly to fluid pump 20, which receives a fluid from container 21. Pump 40 pressurizes the fluid from container 21 and pumps the pressurized fluid to spray guns 22A and 22B. In one embodiment, pump 20 comprises piston pump, such as the Viscount® 4-Ball piston pump commercially available from Graco Inc., Minneapolis, Minn. Spray guns 22A and 22B are lever actuated nozzles that are connected to cables 48A and 48B. Cables 48A and 48B are mechanically pulled by actuators 23. Actuators 23 comprise hydraulic cylinders that are pressurized to displace a piston. Actuators 23 use high pressure hydraulic fluid bled from between pumps 40 and 20. For example, inlet hose 53A provides high pressure fluid to actuator 23, while outlet hose 53B returns low pressure fluid to reservoir 44. Actuators 23 are activated using electric solenoids 24 that are powered and activated by controller 25. Actuators 23 and electric solenoids 24 comprise an electro-hydraulic actuation system of the present disclosure. Controller 25 includes push-button 49 (FIGS. 1A and 1B), or some other activation switch, that sends a signal from controller 25 to solenoids 24 to initiate activation of actuators 23, thus causing discharge of fluid from spray guns 22A and 22B. As shown in FIGS. 1A and 1B, push-button 49 is conveniently located within steering system 12.

Steering system 12, which includes handlebar 26 and speed bar 28 (FIGS. 1A and 1B), provides direct mechanical input to valve 50 and steering wheel 38. Specifically, cables 30A and 30B extend from handlebar 26 to steering wheel 38, while cable 46 extends between speed bar 28 and valve 50 on pump 40.

Returning to FIGS. 1A and 1B, in order to apply stripes, such as to pavement or an athletic field, the hydrostatic system is engaged to provide motive force to power wheels 36A and 36B. As such, stand-on line striper 10 rolls along the surface to which stripes are to be applied. With line striper 10 moving, an operator utilizes steering system 12 to control the speed and direction of line striper 10. Once the operator positions line striper 10 into a place where painted stripes are to be applied, paint system 19 is activated by controller 25. Steering system 12 allows the operator to control activation of paint system 19, the speed of line striper 10 and the direction of line striper 10 with easy to use, intuitive controls. Specifically, push-button 49 is connected to controller 25, which operates solenoids 24 to control actuators 23 and dispense paint at spray guns 22A and 22B, as is discussed with reference to FIGS. 3A-5.

Figure 3B:
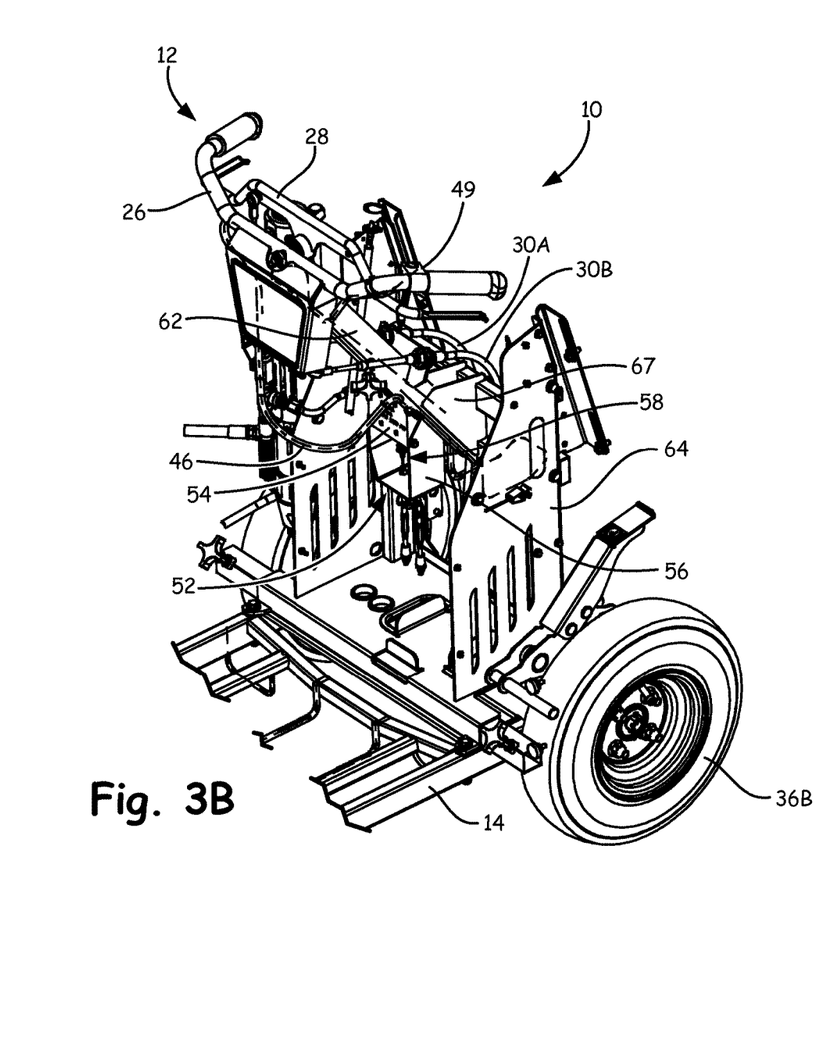

FIGS. 3A and 3B are perspective rear and front views, respectively, of stand-on line striper 10 of FIGS. 1A and 1B with parts of hydraulic system 18 (FIG. 1A) and paint system 19 (FIG. 1A) removed to show electro-hydraulic actuation system 52. Actuation system 52 includes manifold 54, bracket 56, solenoids 57 and actuators 58. FIGS. 3A and 3B are discussed concurrently.

Chassis 14 provides a frame upon which the various systems of line striper 10 and wheels 36A, 36B and 38 are mounted. In the embodiment shown, chassis 14 is fabricated from rectangular tubing bent into a rectilinear shape. Power wheels 36A and 36B are mounted proximate an aft end of chassis 14. In one embodiment, power wheels 36A and 36B are mounted directly onto shafts from motors 42 (FIG. 2). For example, power wheel 36A can be mounted onto a shaft from motor 42A, as shown in FIG. 3A. In other embodiments, power wheels 36A and 36B can be mounted onto spindles extending from chassis 14 and connected to motors 42 via gear systems.

Handlebar 26 and speed bar 28 are mounted on post 62, which is connected to chassis 14 through frame 64. Frame 64 provides a structure for mounting platform 60 (FIG. 1B) upon which an operator of line striper 10 may stand. In one embodiment, post 62 extends telescopically from stud 67 connected to frame 64 such that the height of handlebar 26 relative to platform 60 can be adjusted. Thus, an operator is positioned above power wheels 36A and 36B behind post 62, in position to grasp handlebar 26.

Post 62 provides pivot point 63 for handlebar 26. Pivot point 63 extends along axis A1, which extends generally perpendicularly to both the plane of chassis 14 and axis A2 along which power wheels 36A and 36B rotate. An operator of line striper 10 can rotate handlebar 26 about axis A1 to control the position of steering wheel 38 via cables 30A and 30B. Speed bar 28 is connected to handle bar 26 at pivot point 66. Pivot point 66 extends along axis A3, which extends generally parallel to the plane of chassis 14 and perpendicular to axis A2. Cable 46 extends from speed bar 28 to valve 50 that controls output of hydraulic pump 40 to hydraulic motors 42 (FIG. 2). Rotation of speed bar 28 in opposite directions causes forward or reverse movement of line striper 10. For example, rotation of speed bar 28 about axis A3 in a counter-clockwise direction from center (as depicted) causes valve 50 to route hydraulic fluid through motors 42 in a direction that causes forward movement of line striper 10, while rotation of speed bar 28 about axis A3 in a clockwise direction from center (as depicted) causes valve 50 to route hydraulic fluid through motors 42 in a direction that causes rearward movement of line striper 10.

Handlebar 26 additionally provides a convenient location for mounting push-button 49. Push-button 49 is electrically coupled to controller 25 (FIGS. 1B & 2) to operate paint system 19 (FIG. 1A), including pump 20 and spray guns 22A and 22B.

Push-button 49 is located so that an operator of striper 10 need not remove his or her hands from handlebar 26 in order to initiate operation of paint system 19. In particular, an operator can set parameters of paint system 19 in controller 25 and subsequently, while driving striper 10 in a desired location, operate spray guns 22A and 22B (FIG. 1A) with push-button 49. Actuation system 52 provides rapid, on-off actuation of spray guns 22A and 22B using actuators 58 and solenoids 57. Actuators 58 are hydraulically driven by hydraulic system 18 and solenoids 57 are electrically controlled to operate actuators 58 via controller 25. Actuators 58 and solenoids 57 are mounted to frame 64 using manifold 54 and bracket 56, as are discussed in greater detail with reference to FIGS. 4A-5.

Figure 4A:
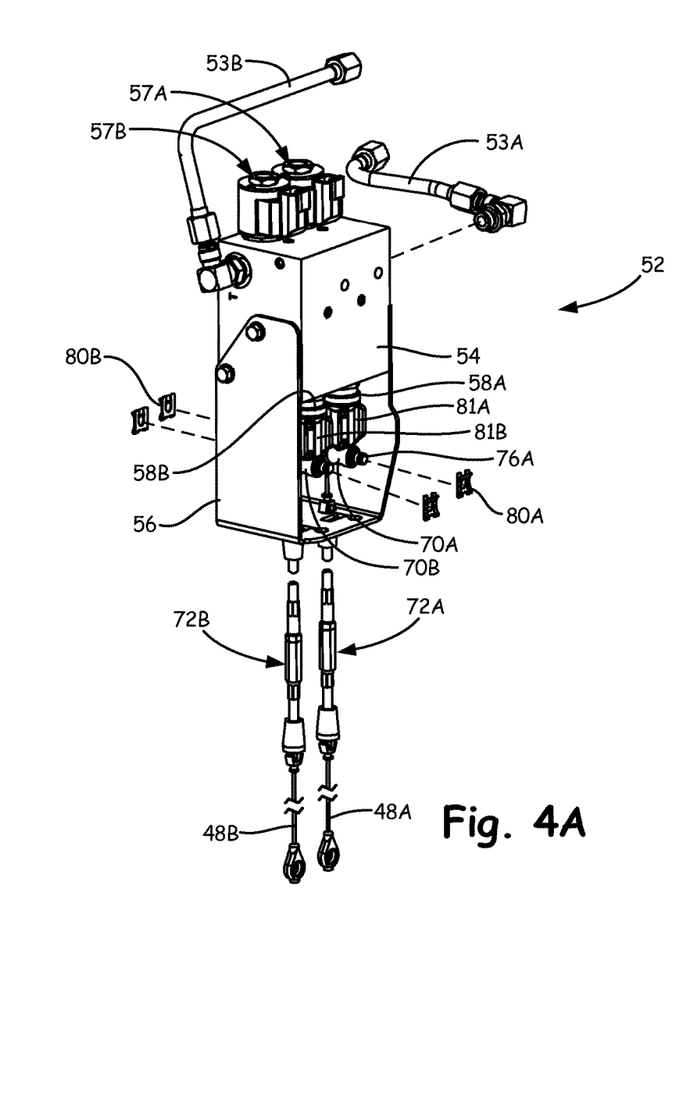
FIGS. 4A and 4B are perspective and exploded views, respectively, of the electro-hydraulic actuation system of FIGS. 3A and 3B showing a manifold connected to hydraulic actuators and electric actuators.
Figure 4B:
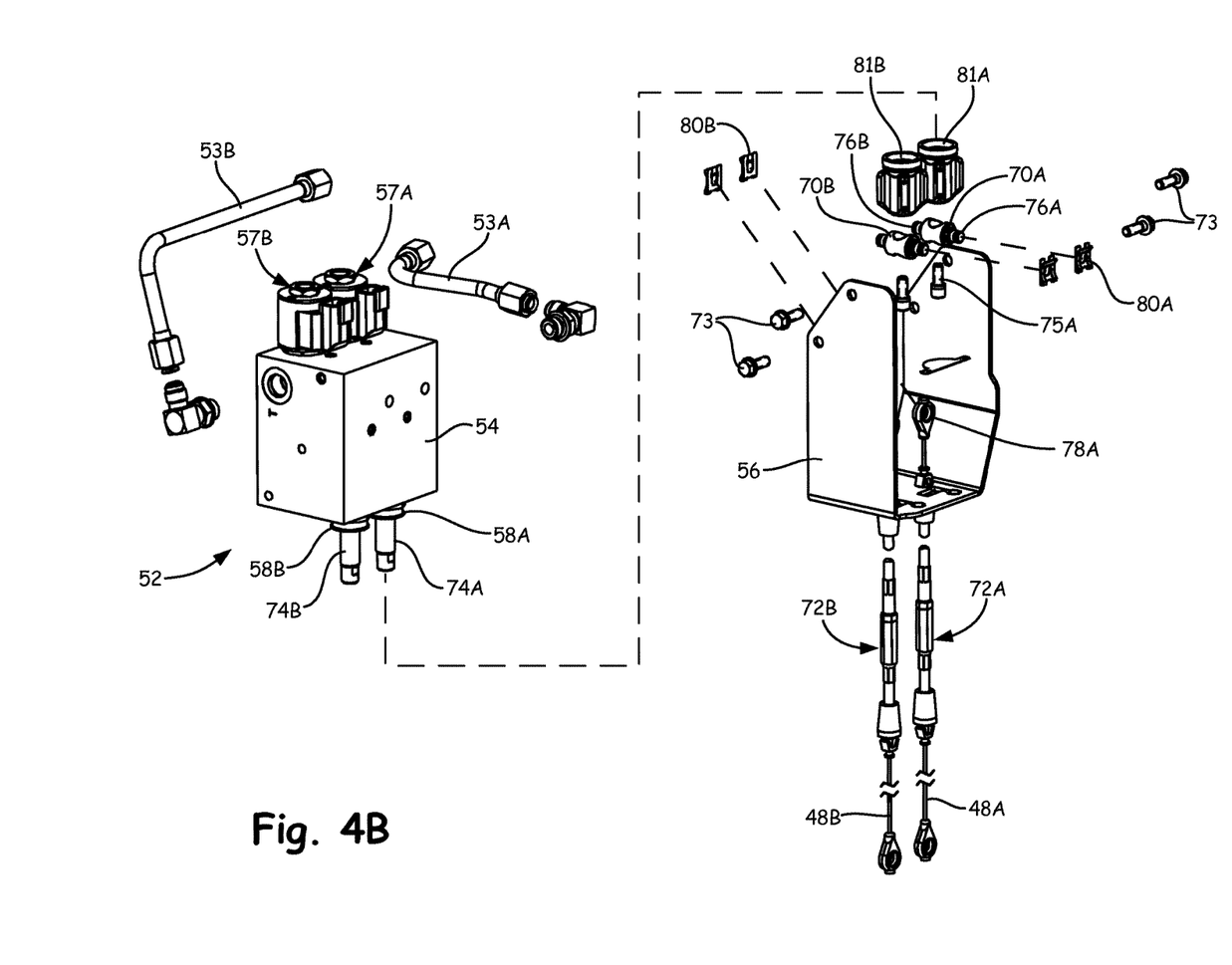

FIGS. 4A and 4B are perspective and exploded views, respectively, of electro-hydraulic actuation system 52 of FIGS. 3A and 3B showing manifold 54, bracket 56, solenoids 57A and 57B and actuators 58A and 58B. Actuation system 52 also includes cables 48A and 48B, inlet hose 53A, outlet hose 53B, couplers 70A and 70B and cable conduits 72A and 72B. FIGS. 4A and 4B are discussed concurrently.

Manifold 54 is mounted to frame 64 (FIG. 3A) of striper 10 (FIG. 1A) in a position conveniently accessible to hydraulic system 18 and paint system 19. Bracket 56 is connected to manifold 54 using fasteners 73. Hoses 53A and 53B are coupled to hydraulic fluid lines connecting hydraulic fluid pump 40 and paint pump 20. Inlet hose 53A connects to a high pressure, feed line, and outlet hose 53B connects to a low pressure, return line. Solenoids 57A and 57B are coupled to manifold 54 to interact with hydraulic fluid passing between inlet hose 53A and outlet hose 53B. Likewise, actuators 58A and 58B are coupled to manifold 54 so that pistons 74A and 74B (FIG. 4B) interact with the hydraulic fluid.

Couplers 70A and 70B are connected to pistons 74A and 74B and include multiple studs that enable each of pistons 74A and 74B to be connected to multiple linkages for actuating multiple paint guns. For example, coupler 70A is joined to piston 74A with fastener 75A, and includes studs 76A and 76B. Eye socket 78A is slipped over stud 76B and clip 80B secures eye socket 78A to coupler 70A. Eye socket 78A is connected to an extension cable that extends through an opening in bracket 56 to pass through cable conduit 72A. Cable 48A links directly to spray gun 22A (FIG. 1A). Cable conduit 72A includes a threaded stud that permits axial adjustment in its length, thereby altering the tension and slack in cable 48A. A second eye socket and cable assembly can be connected to stud 76A and an additional spray gun such that piston 74A can simultaneously actuate two spray guns. Clips 80A and 80B allow quick conversion between single and double spray gun operation. Using all the studs of couplers 70A and 70B, actuation system 52 can actuate up to four spray guns.

Pistons 74A and 74B slide in and out of manifold 54 via hydraulic fluid pressure. Boots 81A and 81B are positioned over pistons 74A and 74B to provide protection from dust, dirt, debris, etc. Pistons 74A and 74B include lands that react with pressurized hydraulic fluid to alternatively drive pistons 74A and 74B up or down, based on the position of solenoids 57A and 57B. For example, with solenoid 57A not activated, a plunger is positioned within manifold 54 so that high pressure hydraulic fluid from inlet hose 53A is routed to a first end of piston 74A and piston 74A is pushed downward (with reference to FIGS. 4A and 4B) so as to not displace cable 48A. When solenoid 57A is activated, a plunger is repositioned within manifold 54 to route high pressure hydraulic fluid from inlet hose 53A to a second end of piston 74A so that piston 74A is pushed upward (with reference to FIGS. 4A and 4B) so as to apply tension to cable 48A, thereby actuating spray gun 22A. Hydraulic fluid continues to run through manifold 54 so long as pump 40 (FIG. 2) is running and is returned to reservoir via outlet hose 53B. Cable conduits 72A and 72B can be adjusted to provide the proper amount of pre-tension in cables 48A and 48B so that actuation system 52 provides rapid activation of spray guns 22A and 22B.

Figure 5:
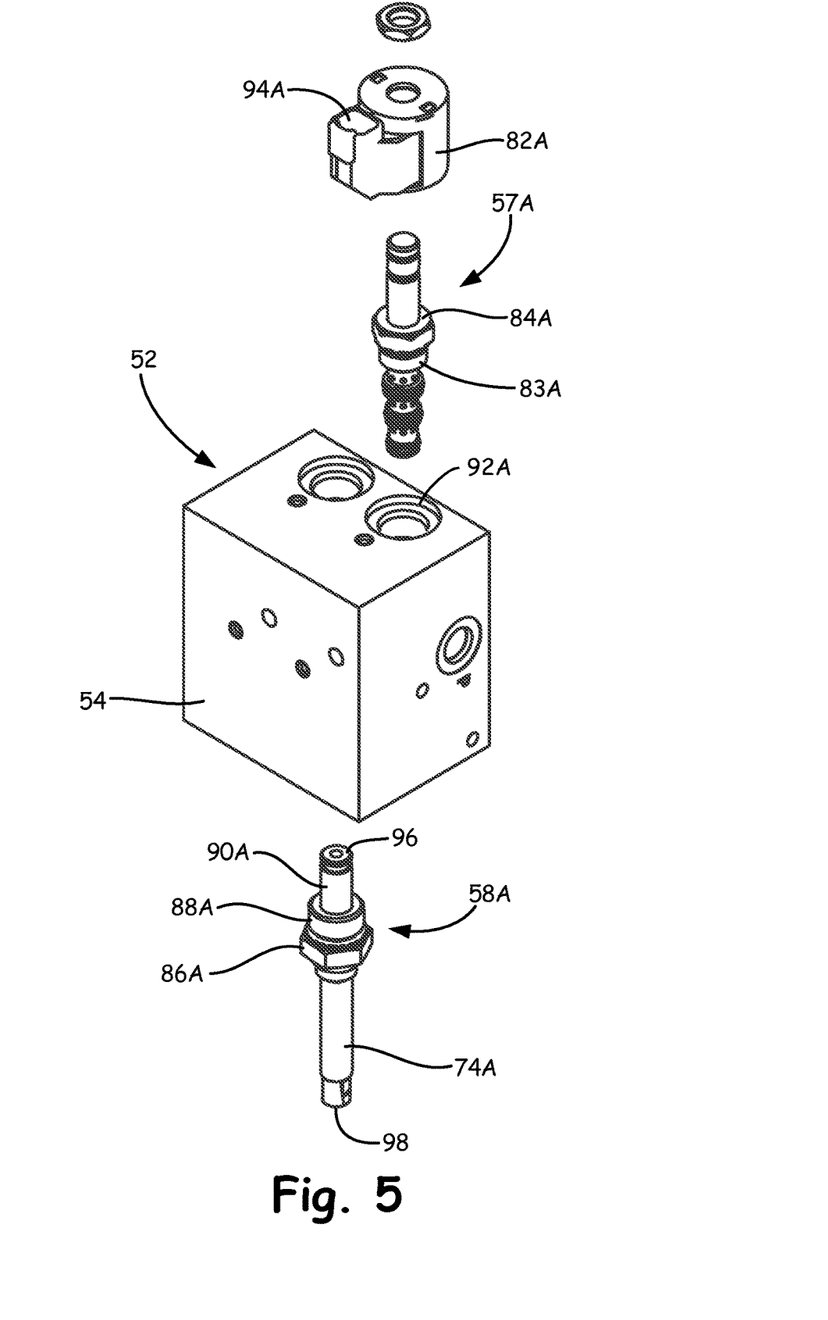
FIG. 5 is an exploded view of the actuation system of FIG. 4B showing a hydraulic piston and an electric plunger exploded from the manifold.

FIG. 5 is an exploded view of actuation system 52 of FIG. 4B showing hydraulic actuator 58A and electric solenoid 57A exploded from manifold 54. Hydraulic actuator 58B and electric solenoid 57B (FIGS. 4A & 4B) are not shown in FIG. 5 for clarity. Solenoid 57A includes coil 82A, housing 83A and spool valve 84A. Hydraulic actuator 58A includes piston 74A, housing 86A, land 88A and land 90A.

Housing 83A of solenoid 57A is threaded into socket 92A in manifold 54 so as to intersect fluid pathways (not shown) between inlet hose 53A and outlet hose 53B. Housing 83A includes various bores that permit hydraulic fluid to pass through housing 83A. Spool valve 84A is inserted into housing 83A and coil 82A is positioned around spool valve 84A. Coil 82A is electrically activated, such as by connection to controller 25 (FIG. 2) by an electrical connection at socket 94A, to displace spool valve 84A, as is known in the art. Spool valve 84A thus moves to cover and uncover various bores in housing 83A. As spool valve 84A moves, piston 74A of actuator 58A is displaced via flow of hydraulic fluid through manifold 54.

Housing 86A of actuator 58A is threaded into a socket (not shown) in manifold 54. Piston 74A extends though housing 86A so as to intersect fluid pathways inside manifold 54 at first end 96. Second end 98 of piston 74A extends out of manifold 54 so as to facilitate connection to coupler 70A (FIG. 4B). Land 88A prevents hydraulic fluid from passing out of housing 86A. Piston 74A is, however, free to move within housing 86A.

For the described embodiment, when spool valve 84A is in a down position (fully inserted into manifold 54), high pressure hydraulic fluid is directed to first end 96 at land 90A to force piston 74A down via passage of the hydraulic fluid through appropriate bores in housing 83A. Thus, cable 48A (FIG. 4B) remains sufficiently slack to not activate spray gun 22A (FIG. 1A). Solenoid 57A may include a spring to bias spool valve 84A to down position, for example, in an un-activated state. When an appropriate electrical signal is provided to socket 94A, coil 82A is activated to move spool valve 84A in housing 83A, uncovering different bores in housing 83A. Thus, when spool valve 84A is in an up position (withdrawn from manifold 54), high pressure hydraulic fluid is directed to the underside of land 88A to force piston 74A up via passage of the hydraulic fluid through appropriate bores in housing 83A. Thus, cable 48A is put into tension and displaced to mechanically trip a lever controlling flow of fluid through a valve in spray gun 22A.

High pressure hydraulic fluid is directed to piston 74A for both activated and un-activated states of solenoid 57A. Actuation system 52 does not rely on a pressure drop in manifold 54 to stop dispensing at spray gun 22A. Instead, actuation system 52 actively moves piston 74A in both directions. Thus, piston 74A rapidly responds to both states, which leads to precise and accurate control of the striping process by controller 25. Controller 25 and actuation system 52 additionally increase the precision and accuracy of the striping process by automating the activation process, which is manually controlled in conventional, prior art systems. Furthermore, actuation system 52 is incorporated into a hydraulic system within the line striping system, thereby reducing the need for additional, dedicated components for the paint system, such as an air compressor. Push-button 49 (FIG. 1A) provides a user-friendly means of commanding controller 25 when to activate solenoids 57A and 57B to commence painting operations.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A line striping system comprising: a hydraulic system for pressurizing a hydraulic fluid; a hydraulic actuator powered by the hydraulic system; an electric actuator that activates the hydraulic actuator; a fluid pump that provides pressurized fluid; and
a spray gun comprising a lever actuated nozzle having a lever mechanically linked to the hydraulic actuator so that activation of the hydraulic actuator by the electric actuator opens the lever actuated nozzle by applying a force from the hydraulic actuator to the lever causing the spray gun to discharge the pressurized fluid to produce a stripe line; and
a cable connecting a piston of the hydraulic actuator to the lever of the lever actuated nozzle.

2. The system of claim 1 and further comprising:
a hydraulic fluid manifold connecting the hydraulic actuator and the electric actuator;
wherein the electric actuator controls flow of hydraulic fluid from the hydraulic system to the hydraulic actuator.

3. The system of claim 2, wherein the hydraulic actuator comprises a piston extending from the hydraulic fluid manifold.

4. The system of claim 1 and further comprising:
couplers for connecting cables from lever actuated nozzles of multiple spray guns to the piston.

5. The system of claim 3, wherein the electric actuator comprises a solenoid having a coil and a spool valve, wherein the spool valve extends into the manifold.

6. The system of claim 5, wherein the hydraulic actuator comprises a two-way actuator and the spool valve controls hydraulic fluid flow to opposite ends of the piston.

7. The system of claim 1, wherein the fluid pump is powered by the hydraulic system.

8. The system of claim 1 and further comprising:
a programmable controller in communication with the electric actuator, the controller including a switch to activate the electric actuator.

9. The system of claim 1 and further comprising:
an additional hydraulic actuator powered by the hydraulic system;
an additional electric actuator that activates the additional hydraulic actuator;
an additional spray gun mechanically linked to the additional hydraulic actuator, the additional spray gun having an additional lever actuated nozzle having a lever mechanically linked to the additional hydraulic actuator so that activation of the additional hydraulic actuator by the additional electric actuator opens the additional lever actuated nozzle by applying a force from the additional hydraulic actuator to the lever of the additional lever actuated nozzle causing the additional spray gun to discharge the pressurized fluid; and
an additional cable connecting a piston of the additional hydraulic actuator to the lever of the additional lever actuated nozzle.

10. An actuation system for a line striper, the actuation system comprising:
a fluid manifold;
a hydraulic actuator mounted to the fluid manifold and having a piston extending from the fluid manifold;
an electric actuator that activates the hydraulic actuator coupled to the fluid manifold and having a plunger that controls fluid flow through the manifold to the piston;
a cable linkage extending from the piston;
a spray gun having a control lever connected to the cable linkage; and a fluid pump that provides pressurized fluid to the spray gun;
wherein activation of the hydraulic actuator by the electric actuator applies a force through the cable linkage to the control lever of the spray gun to cause the control lever to actuate the spray gun to discharge the pressurized fluid to produce a stripe line.

11. The actuation system of claim 10, wherein the plunger controls fluid flow to move the piston in a first direction when the electric actuator is activated and a second direction when the electric actuator is not activated.

12. The actuation system of claim 10 and further comprising:
a hydraulic pump that provides pressurized hydraulic fluid to the fluid pump and the hydraulic actuator.

13. A line striping system comprising: a chassis having a plurality of wheels on which the chassis rolls; a hydraulic system for pressurizing a hydraulic fluid, the hydraulic system mounted on the chassis;
a hydraulic actuator powered by the hydraulic system, the hydraulic actuator operated by a valve; an electric actuator that actuates the valve to activate the hydraulic actuator; a controller that operates the electric actuator to actuate the valve; a fluid pump that provides pressurized fluid, the fluid pump mounted on the chassis; a cable mechanically linked to the hydraulic actuator such that the cable is pulled by the hydraulic actuator when the hydraulic actuator is activated; and a spray gun that receives fluid pumped from the fluid pump and that is actuated by a lever to discharge the fluid, the spray gun mounted on the chassis, the lever mechanically linked to the cable such that the lever is moved by the hydraulic actuator via the cable so that activation of the hydraulic actuator by the electric actuator causes the spray gun to discharge the fluid to produce a stripe line.

14. The system of claim 13, wherein the controller operates the electric actuator responsive to a push-button.

15. The system of claim 13, wherein the valve is a spool valve.

16. The system of claim 13, wherein the electric actuator is a solenoid.

17. The system of claim 13 and further comprising:
a hydraulic fluid manifold connecting the hydraulic actuator and the electric actuator;
wherein the electric actuator controls flow of hydraulic fluid from the hydraulic system to the hydraulic actuator.

18. The system of claim 17, wherein the hydraulic actuator comprises a piston extending from the hydraulic fluid manifold, and wherein the cable is mechanically linked to the piston.

19. The system of claim 13 and further comprising:
couplers for connecting cables from levers of multiple spray guns to the hydraulic actuator.

20. The system of claim 13 and further comprising:
an additional hydraulic actuator powered by the hydraulic system;
an additional electric actuator that activates the additional hydraulic actuator;
an additional cable mechanically linked to the additional hydraulic actuator such that the additional cable is pulled by the additional hydraulic actuator when the additional hydraulic actuator is activated; and
an additional spray gun that receives fluid pumped from the fluid pump and that is actuated by a lever to discharge the fluid, the additional spray gun mounted on the chassis, the lever mechanically linked to the additional cable such that the lever is moved by the additional hydraulic actuator via the additional cable so that activation of the additional hydraulic actuator by the additional electric actuator causes the additional spray gun to discharge the fluid.

* * * * *